US010288131B2

(12) United States Patent
Kitamura et al.

(10) Patent No.: US 10,288,131 B2
(45) Date of Patent: May 14, 2019

(54) CONTROL DEVICE OF VEHICLE

(71) Applicant: TOYOTA JIDOSHA KABUSHIKI KAISHA, Toyota-shi, Aichi (JP)

(72) Inventors: Shin Kitamura, Toyota (JP); Hironobu Aratake, Kariya (JP); Norihiro Tsukamoto, Toyota (JP); Tomohiro Asami, Nisshin (JP); Hiromasa Takai, Anjo (JP); Daiki Fukuda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 15/644,154

(22) Filed: Jul. 7, 2017

(65) Prior Publication Data

US 2018/0031055 A1 Feb. 1, 2018

(30) Foreign Application Priority Data

Jul. 29, 2016 (JP) .................................. 2016-150696

(51) Int. Cl.

| F16H 61/12 | (2010.01) |
|---|---|
| F16D 48/02 | (2006.01) |
| F16D 25/062 | (2006.01) |
| F16H 61/02 | (2006.01) |
| F16H 61/686 | (2006.01) |

(Continued)

(52) U.S. Cl.
CPC ........... *F16D 25/14* (2013.01); *F16D 25/062* (2013.01); *F16H 61/0267* (2013.01); *F16H 61/0403* (2013.01); *F16H 61/686* (2013.01); *F16H 2061/0043* (2013.01); *F16H 2061/1208* (2013.01); *F16H 2061/1264* (2013.01); *F16H 2200/006* (2013.01); *F16H 2200/201* (2013.01);

(Continued)

(58) Field of Classification Search
CPC ................. F16H 2061/0043; F16H 2061/1264
See application file for complete search history.

(56) References Cited

U.S. PATENT DOCUMENTS

| 7,128,084 B2* | 10/2006 | Long ....................... F16H 61/12 |
|---|---|---|
| | | 137/238 |
| 8,024,096 B2* | 9/2011 | Moriya ................. F16H 61/061 |
| | | 701/58 |

(Continued)

FOREIGN PATENT DOCUMENTS

JP 2009-085341 A 4/2009

*Primary Examiner* — David R Morris
(74) *Attorney, Agent, or Firm* — Oliff PLC

(57) ABSTRACT

A vehicle control device including a multi-speed transmission switching gear shift positions in accordance with a combination of hydraulic friction engagement devices operations and pressure control solenoid valves, the control device shifting gears by providing a shift output signal including a quick-apply signal to the valves after a first time from a shift request, the control device has: a pulsation drive control portion to control selectively pulsating the pressure control solenoid valves in a cycle; and a quick-apply control prohibiting portion to prohibit a provision of a quick-apply control using the quick-apply signal for a second time from a time of termination of the pulsation drive control, and to permit the provision of the quick-apply control after the elapse of the second time, for a valve having undergone the control, the pulsation drive control portion to terminate the control for a valve when the shift request is made.

3 Claims, 8 Drawing Sheets

(51) Int. Cl.
 *F16H 61/04* (2006.01)
 *F16H 61/00* (2006.01)
(52) U.S. Cl.
 CPC .................. *F16H 2200/202* (2013.01); *F16H 2200/2025* (2013.01); *F16H 2200/2046* (2013.01)

(56) References Cited

U.S. PATENT DOCUMENTS

| | | | | |
|---|---|---|---|---|
| 8,392,076 | B2* | 3/2013 | Kobayashi | F16H 61/20 192/103 R |
| 8,589,041 | B2* | 11/2013 | Kobayashi | F16H 61/061 701/60 |
| 8,992,382 | B2* | 3/2015 | Matsuo | F16H 61/0213 477/115 |
| 2006/0131528 | A1* | 6/2006 | Long | F16H 61/12 251/62 |
| 2007/0298933 | A1* | 12/2007 | Long | F16H 61/02 477/149 |
| 2008/0039284 | A1* | 2/2008 | Asami | B60W 10/06 477/109 |
| 2009/0111653 | A1* | 4/2009 | Fukaya | F16D 48/066 477/121 |
| 2009/0312924 | A1* | 12/2009 | Moriya | F16H 61/061 701/58 |
| 2010/0191430 | A1* | 7/2010 | Kobayashi | F16H 61/061 701/60 |
| 2010/0204892 | A1* | 8/2010 | Kobayashi | F16H 61/20 701/51 |
| 2013/0110365 | A1* | 5/2013 | Kimura | F16H 61/12 701/65 |
| 2014/0315686 | A1* | 10/2014 | Matsuo | F16H 61/0213 477/120 |
| 2017/0050640 | A1* | 2/2017 | Toyokawa | F16H 61/061 |

* cited by examiner

FIG.3

|   | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

○: ENGAGEMENT   BLANK: RELEASE

CONTROL DEVICE OF VEHICLE

The disclosure of Japanese Patent Application No. 2016-150696 filed on Jul. 29, 2016 including the specification, drawings and abstract is incorporated herein by reference in its entirety.

TECHNICAL FIELD

The present invention relates to a technique of suppressing a reduction in drivability due to an operation delay of a pressure control solenoid valve supplying a hydraulic pressure to a hydraulic friction engagement device in a vehicle providing a pulsation drive control for the pressure control solenoid valve.

BACKGROUND ART

A control device of a vehicle is known that provides a pulsation drive control of selectively pulsating a plurality of pressure control solenoid valves in a predetermined cycle in a vehicle including a multi-speed transmission switching gear shift positions in accordance with combination of operations of a plurality of hydraulic friction engagement devices and the plurality of pressure control solenoid valves respectively controlling the operations of the hydraulic friction engagement devices. This corresponds to a control device of a vehicle of Patent Document 1.

PRIOR ART DOCUMENT

Patent Document

Patent Document 1: Japanese Laid-Open Patent Publication No. 2009-85341

SUMMARY OF THE INVENTION

Problem to be Solved by the Invention

There is a possibility that a pulsation drive control may be being provided, or may be terminated a little while ago, in the pressure control solenoid valve corresponding to a hydraulic friction engagement device establishing a gear that is achieved after shifting determined based on an operational state of a vehicle. If a quick-apply control is performed with the pressure control solenoid valve for supplying a predetermined amount of hydraulic fluid to a hydraulic actuator of the hydraulic friction engagement device while a hydraulic pressure supplied the hydraulic friction engagement device is not stable immediately after termination of the pulsation drive control, a hydraulic pressure larger than a normal hydraulic pressure at the time of packing may act on the hydraulic actuator of the hydraulic friction engagement device, possibly resulting in a so-called stroke hit causing a piston to press a friction plate due to a piston stroke. Therefore, it is conceivable that the start of the quick-apply control is delayed from the time point of termination of the pulsation drive control for the pressure control solenoid valve according to a shift output signal from a control device until the hydraulic pressure supplied to the hydraulic friction engagement device becomes stable. However, this may lead to a reduction in drivability due to a delay of a shift start because the start of the quick-apply control is delayed from the time point of output of a shift output signal after a predetermined time from a shift request based on the operational state.

The present invention was conceived in view of the situations and it is therefore an object of the present invention to suppress a reduction in drivability due to a delay in operation of a pressure control solenoid valve supplying a hydraulic pressure to a hydraulic friction engagement device in a vehicle providing a pulsation drive control for the pressure control solenoid valve.

Solution to Problem

The object indicated above is achieved according to a first aspect of the present invention which provides a control device of a vehicle including a multi-speed transmission switching gear shift positions in accordance with combination of operations of a plurality of hydraulic friction engagement devices and a plurality of pressure control solenoid valves respectively controlling pressures of hydraulic fluid to the plurality of hydraulic friction engagement devices, the control device of a vehicle shifting gears by providing a shift output signal including a quick-apply signal to the plurality of pressure control solenoid valves after a first predetermined time from a shift request based on an operational state, comprising: a pulsation drive control portion providing a pulsation drive control of selectively pulsating the plurality of pressure control solenoid valves in a predetermined cycle; and a quick-apply control prohibiting portion prohibiting a provision of a quick-apply control using the quick-apply signal for a second predetermined time from a time of termination of the pulsation drive control, and permitting the provision of the quick-apply control after the elapse of the second predetermined time, for a pressure control solenoid valve having undergone the pulsation drive control out of the plurality of pressure control solenoid valves, the pulsation drive control portion terminating the pulsation drive control for a pressure control solenoid valve undergoing the pulsation drive control out of the plurality of pressure control solenoid valves when the shift request is made.

A second aspect of the present invention provides the control device of a vehicle recited in the first aspect of the present invention, wherein the second predetermined time is set shorter as a temperature of the hydraulic fluid becomes higher.

A third aspect of the present invention provides the control device of a vehicle recited in the first or second aspect of the present invention, wherein the shift of the multi-speed transmission is performed by releasing a release-side hydraulic friction engagement device engaging an engagement-side hydraulic friction engagement device out of the plurality of hydraulic friction engagement devices, and wherein the pressure control solenoid valve having undergone the pulsation drive control controls a pressure of the hydraulic fluid to the engagement-side hydraulic friction engagement device.

Advantageous Effects of the Invention

The control device recited in the first aspect of the invention includes the pulsation drive control portion providing the pulsation drive control of selectively pulsating the plurality of pressure control solenoid valves in a predetermined cycle, and the quick-apply control prohibiting portion prohibiting a provision of the quick-apply control using the quick-apply signal for the second predetermined time from the time of termination of the pulsation drive control, and permitting the provision of the quick-apply control after the elapse of the second predetermined time, for the pressure control solenoid valve having undergone the pulsation drive control out of the plurality of pressure control solenoid valves, and the pulsation drive control portion terminates the pulsation drive control for the pressure control solenoid valve undergoing the pulsation drive control out of the plurality of pressure control solenoid valves when the shift request is made. Therefore, since the pulsation drive control is terminated when the shift request is determined, the quick-apply control can be started earlier as compared to when the quick-apply control is started after the elapse of the second predetermined time from the termination of the pulsation drive control at the time point of output of the shift output signal. As a result, the start delay of the quick-apply control can be suppressed for the pressure control solenoid valve undergoing the pulsation drive control involved in the shift in the vehicle providing the pulsation drive control for the pressure control solenoid valves. Consequently, the reduction in drivability due to the operation delay of the pressure control solenoid valve can be suppressed.

According to the control device recited in the second aspect of the invention, the second predetermined time is set shorter as the temperature of the hydraulic fluid becomes higher. Therefore, the second predetermined time from the termination of the pulsation drive control to the stabilization of the pressure of the hydraulic fluid supplied to the hydraulic friction engagement device is set depending on the temperature of the hydraulic fluid, so that the start delay of the quick-apply control in the hydraulic friction engagement device can further be suppressed as compared to when the second predetermined time is set in advance as a constant value, for example.

According to the control device recited in the third aspect of the invention, the shift of the multi-speed transmission is performed by releasing the release-side hydraulic friction engagement device and engaging the engagement-side hydraulic friction engagement device out of the plurality of hydraulic friction engagement devices, and the pressure control solenoid valve having undergone the pulsation drive control controls a pressure of the hydraulic fluid to the engagement-side hydraulic friction engagement device. Therefore, the pulsation drive control is terminated in the engagement-side hydraulic friction engagement device achieving the clutch-to-clutch shift at the time point of determination of the shift request, so that as compared to when the quick-apply control for the engagement-side hydraulic friction engagement device is started after the second predetermined time from the termination of the pulsation drive control for the engagement-side hydraulic friction engagement device at the time point of output of the shift output signal, the start delay of the quick-apply control can be suppressed in the engagement-side hydraulic friction engagement device achieving the clutch-to-clutch shift. As a result, the reduction in drivability due to the operation delay of the pressure control solenoid valve can be suppressed in the clutch-to-clutch shift.

BRIEF DESCRIPTION OF DRAWINGS

FIG. 3 is an operation chart for explaining a relationship between a shift operation of the automatic transmission and a combination of operations of engagement devices used therefor.

MODES FOR CARRYING OUT THE INVENTION

An example of the present invention will now be described in detail with reference to the drawings.

Example

Figure 1:
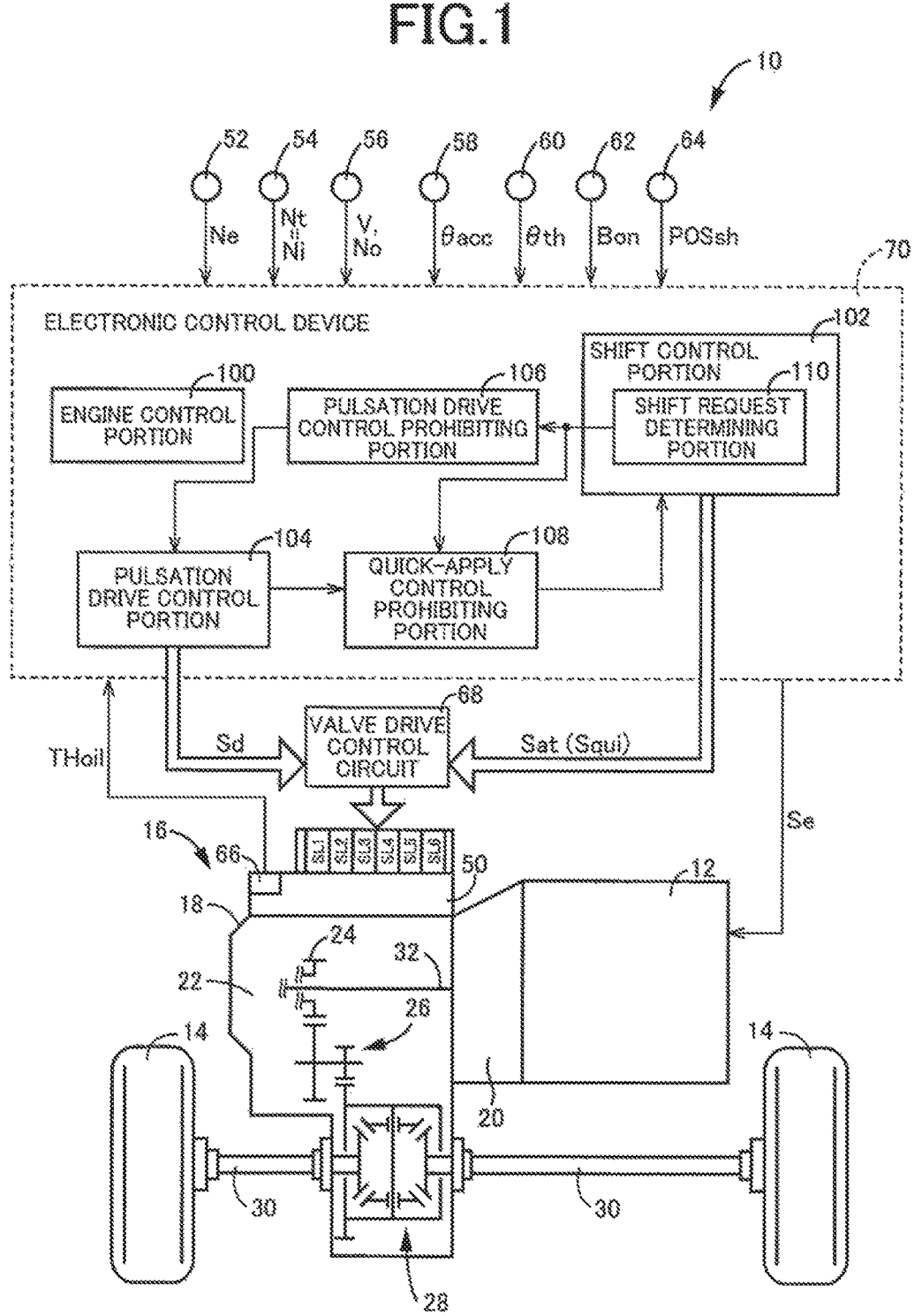
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. In the engine 12, an engine torque Te is controlled through control of an operational state such as an intake air amount, a fuel supply amount, and an ignition timing by an electronic control device 70 described later.

Figure 2:
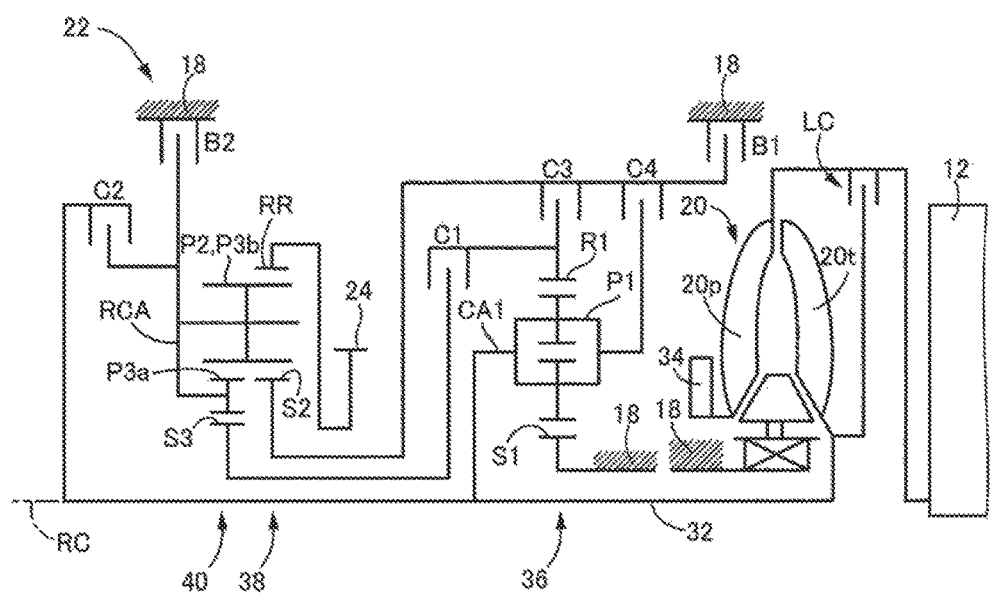
FIG. 2 is a schematic for explaining an example of a torque converter and an automatic transmission.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 32 that is an input rotating member of the automatic transmission 22 and have lower halves from the axial center RC not shown in FIG. 2.

In FIG. 2, the torque converter 20 is disposed to rotate around the axial center RC in a power transmission path between the engine 12 and the automatic transmission 22 and is a fluid transmission device including a pump impeller 20p coupled to the engine 12, a turbine impeller 20t coupled to the transmission input shaft 32, etc. The transmission input shaft 32 also serves as a turbine shaft rotationally driven by the turbine impeller 20t. The power transmission device 16 also includes a lockup clutch LC capable of direct coupling between the pump impeller 20p and the turbine impeller 20t (i.e., between the input/output rotating members of the torque converter 20). The power transmission device 16 also includes a mechanical oil pump 34 coupled to the pump impeller 20p. The oil pump 34 is rotationally driven by the engine 12 to generate (discharge) a hydraulic fluid pressure serving as a source pressure for providing a shift control of the automatic transmission 22 and supplying lubrication oil to portions of the power transmission path of the power transmission device 16. Therefore, the hydraulic fluid pumped up by the oil pump 34 is supplied as a source pressure of a hydraulic control circuit 30 (see FIG. 1) included in the vehicle 10.

The automatic transmission 22 is a multi-speed type automatic transmission constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 (hereinafter simply referred to as hydraulic friction engagement devices C if not particularly distinguished).

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of thirds planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

The hydraulic friction engagement devices C are used so as to selectively couple members on both sides between which the device is interposed, and made up of wet multi-plate type clutches and brakes each having a plurality of friction plates overlapped with each other and pressed by a hydraulic piston, and/or band brakes each having one or two bands wound around an outer circumference of a rotating drum and fastened at one end by a hydraulic piston, etc. The hydraulic friction engagement devices C have respective torque capacities (i.e., clutch torques Tc) changed in accordance with a change in pressing force against the friction plates from hydraulic pistons where a stroke of each of the hydraulic pistons in a direction toward the friction plates is changed by respective hydraulic pressure (i.e., clutch pressure Pc) output from solenoid valve SL1 to SL6 etc. in the hydraulic control circuit 50, so that the respective operation state of each of the hydraulic friction engagement devices C (such as engaged state, released state and the like) are switched. To transmit a torque (e.g., a transmission input torque Ti, i.e., a turbine torque Tt, input to the transmission input shaft 32) between the transmission input shaft 32 and the transmission output gear 24 without slipping the hydraulic friction engagement devices C (i.e., without generating a differential rotation speed in the hydraulic friction engagement devices C), each of the hydraulic friction engagement devices C needs to have a torque capacity capable of providing a transmission torque that must be assigned thereto (i.e., a shared torque of the hydraulic friction engagement device C) with respect to the torque. However, at the torque capacity capable of providing the transmitted torque, the transmission torque does not increase even if the torque capacity is increased. In this example, the clutch torque Tc and the clutch pressure Pc may synonymously be used for convenience.

In the automatic transmission 22, a so-called clutch-to-clutch shift is performed by contorting engagement of an engagement-side hydraulic friction engagement device (i.e. a hydraulic friction engagement device to be engaged) and release of a release-side hydraulic friction engagement device (i.e. a hydraulic friction engagement device to be released) out of the hydraulic friction engagement devices C by the electronic control device 70 described later in accordance with a driver's accelerator operation, a vehicle speed V, etc., so that a plurality of gear positions (gear shift positions) different in gear ratio (speed change ratio) γ (=AT input rotation speed Ni/AT output rotation speed No) are selectively switched in accordance with combination of the operations thereof. For example, as shown in an engagement operation table in FIG. 3, the automatic transmission 22 has eight forward gear positions from a first speed gear position "1st" to an eighth speed gear position "8th" and a reverse gear position "Rev" such that the gear positions are selectively established. The AT input rotation speed Ni is the rotation speed of the transmission input shaft 32 and the AT output rotation speed No is the rotation speed of the transmission output gear 24. The gear ratio γ of the automatic transmission 22 corresponding to each of the gear positions is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio γ is the highest at the first speed gear position "1st" and decreases toward the higher vehicle speed side (the eighth speed gear position "8th" side). The automatic transmission 22 corresponds to a multi-speed transmission of the present invention.

The engagement operation table of FIG. 3 represents the relationship between the gear positions established in the automatic transmission 22 and the operation states of the engagement devices C, and "o" and a blank indicate engagement and release of the hydraulic friction engagement devices C, respectively.

Returning to FIG. 1, the vehicle 10 includes the electronic control device 70 including a control device of the vehicle 10 related to the shift control of the automatic transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and is configured separately for the engine output control, the hydraulic control (the shift control), etc., as needed.

The electronic control device 70 is supplied with various signals (e.g., an engine rotation speed Ne (rpm), the AT input rotation speed Ni (rpm) that is also the rotation speed of the turbine shaft (i.e., a turbine rotation speed Nt), the AT output rotation speed No (rpm) corresponding to the vehicle speed V, an accelerator opening degree θacc (%) that is an operation amount of an accelerator pedal, a throttle valve opening degree θth (%) that is an opening degree of an electronic throttle valve, a brake-on Bon that is a signal indicative of a brake operation state when a driver operates a brake operation member for operating a wheel brake, an operation position (shift position) POSsh of a shift lever 82 (shown in FIG. 4) such as "P", "R", "N", and "D", etc., and a hydraulic fluid temperature THoil (° C.) that is a temperature of hydraulic fluid in the hydraulic control circuit 50) based on detection values from various sensors etc. disposed in the vehicle 10 (e.g., an engine rotation speed sensor 52, an input rotation speed sensor 54, an output rotation speed sensor 56, an accelerator opening degree sensor 58, a throttle valve opening degree sensor 60, a brake switch 62, a shift position sensor 64, and an oil temperature sensor 66). The electronic control device 70 supplies various devices included in the vehicle 10 (e.g., the engine 12 and the hydraulic control circuit 50) with various command signals (e.g., an engine control command signal Se and a shift output signal Sat). A valve drive control circuit 68 outputs based on this shift output signal Sat to the hydraulic control circuit 50 a drive signal (hydraulic pressure command value, instruction pressure) for driving the solenoid valves SL1 to SL6 regulating the hydraulic pressures (i.e., the clutch pressures Pc) supplied to the hydraulic actuators of the hydraulic friction engagement devices C.

Figure 4:
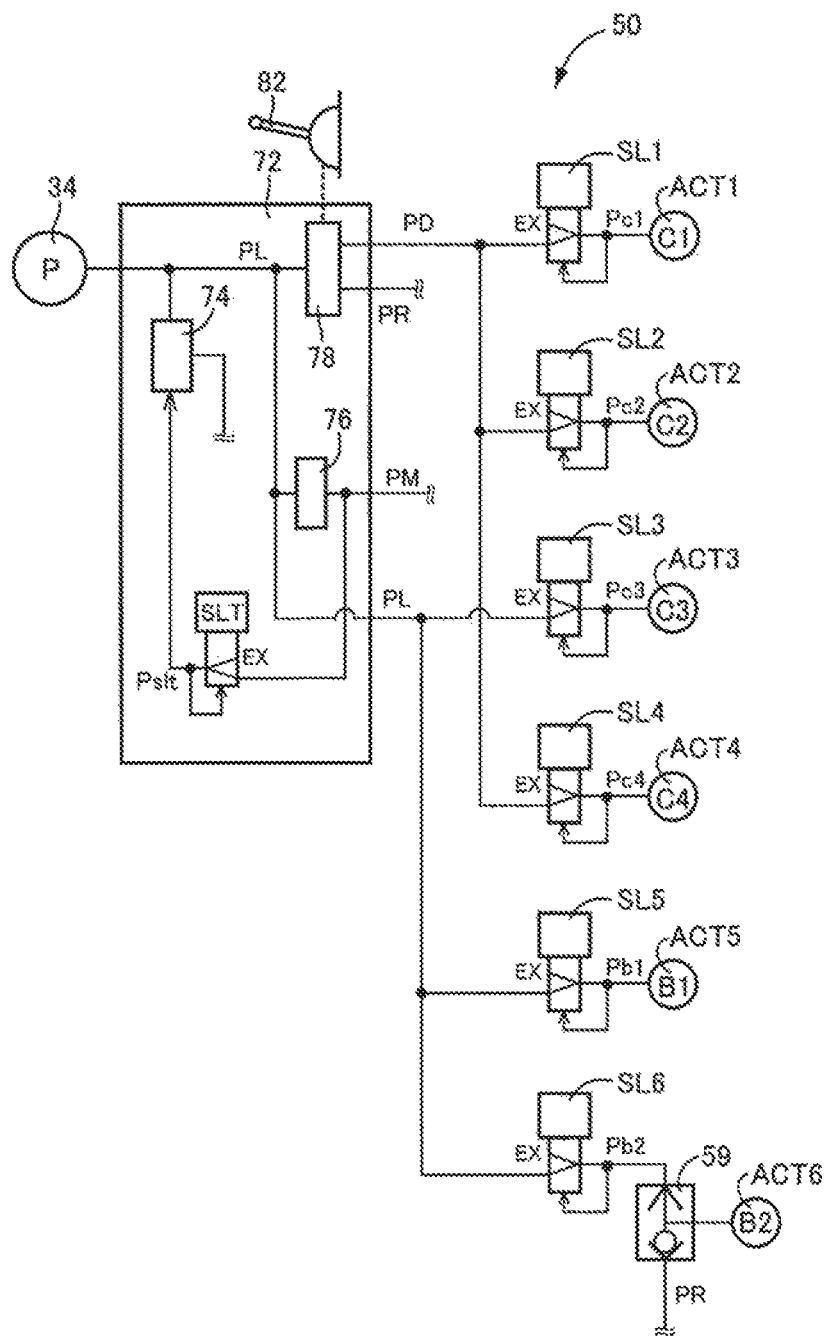
FIG. 4 is a circuit diagram of a main portion of a hydraulic control circuit shown in FIG. 1 related to solenoid valves SL1 to SL6 etc. controlling operations of hydraulic actuators ACT1 to ACT6 of the engagement devices.

FIG. 4 is a circuit diagram of a main portion of the hydraulic control circuit 50 related to solenoid valves SL1 to SL6 etc. controlling operations (operation states) of hydraulic actuators ACT1 to ACT6 of the hydraulic friction engagement devices C. In FIG. 4, the hydraulic control circuit 50 includes a hydraulic supply device 72 and a plurality of the solenoid valves SL1 to SL6 respectively controlling the operations of the plurality of the hydraulic friction engagement devices C. The hydraulic actuators ACT1 to ACT6 and the solenoid valves SL1 to SL6 will hereinafter be referred to as hydraulic actuators ACT and solenoid valves SL when not particularly distinguished.

The hydraulic supply device 72 includes a primary regulator valve 74 regulating a line hydraulic pressure PL by using the hydraulic pressure generated by the oil pump 34 as a source pressure, a solenoid valve SLT supplying a signal pressure Pslt to the primary regulator valve 74 for the regulation of the line hydraulic pressure PL depending on an engine load (synonymous with an engine torque Te, a transmission input torque Tat, etc.) represented by the throttle valve opening degree θth etc., a modulator valve 76 regulating a modulator hydraulic pressure PM to a constant value by using the line hydraulic pressure PL as a source pressure, and a manual valve 78 mechanically switching oil passages in conjunction with a switching operation of the shift lever 82. The manual valve 78 outputs the input line hydraulic pressure PL as a forward hydraulic pressure (D range pressure, drive hydraulic pressure) PD when the shift lever 82 is at the operation position D or the operation position M, and outputs the input line hydraulic pressure PL as a backward hydraulic pressure (R range pressure, reverse hydraulic pressure) PR when the shift lever 82 is at the operation position R. When the shift lever 82 is at the operation position N or the operation position P, the manual valve 78 interrupts the output of the hydraulic pressure and guides the drive hydraulic pressure PD and the reverse hydraulic pressure PR to the discharge side. In this way the hydraulic supply device 72 outputs the line hydraulic pressure PL, the modulator hydraulic pressure PM, the drive hydraulic pressure PD, and the reverse hydraulic pressure PR.

The hydraulic actuators ACT1, ACT2, ACT4 of the clutches C1, C2, C4 are supplied with hydraulic pressures Pc1, Pc2, Pc4 regulated by the solenoid valves SL1, SL2, SL4, respectively, by using the drive hydraulic pressure PD as a source pressure. The hydraulic actuators ACT3, ACT5, ACT6 of the clutch C3, the brakes B1 and B2 are supplied with hydraulic pressures Pc3, Pb1, Pb2 regulated by the solenoid valves SL3, SL5, SL6, respectively, by using the line hydraulic pressure PL as a source pressure.

The solenoid valves SL basically have the same structure and each include an input port supplied with the drive hydraulic pressure PD or the line hydraulic pressure PL regulated to a constant value, au output port outputting a hydraulic pressure to each of the hydraulic actuators ACT, a discharge port discharging a hydraulic pressure from each of the hydraulic actuators ACT, a spool valve piece opening and closing between the input port and the output port, a spring urging the spool valve piece in the valve closing direction, an electromagnetic solenoid urging the spool valve piece in the valve opening direction in accordance with a drive signal (current command value) from the valve drive control circuit 68, and a feedback chamber introducing a hydraulic pressure supplied to each of the hydraulic actuators ACT and thereby urging the spool valve piece in the valve closing direction, such that the spool valve piece is moved in the axial direction in accordance with the drive signal so as to independently regulate each of the hydraulic pressures Pc1, Pc2, Pc3, Pc4, Pb1, Pb2. In this way, the solenoid valves SL control the operations of the hydraulic friction engagement devices C.

The hydraulic control circuit 50 includes a shuttle valve 59, and either the hydraulic pressure Pb2 or the reverse hydraulic pressure PR supplied is supplied via the shuttle valve 59 to the hydraulic actuator ACT6 of the brake B2. In this way, the hydraulic control circuit 50 supplies the hydraulic pressures to the hydraulic friction engagement devices C based on the shift output signal Sat (hydraulic pressure instruction value) output by the electrode control device 70. The manual valve 78 outputs the drive hydraulic pressure PD and the reverse hydraulic pressure PR serving as the source pressure of the hydraulic pressures supplied to the hydraulic friction engagement devices C.

As shown in FIG. 1, to implement a control function for various controls in the vehicle 10, the electronic control device 70 includes an engine control portion 100, a shift control portion 102, a pulsation drive control portion 104, a pulsation drive control prohibiting portion 106, and a quick-apply control prohibiting portion 108. The shift control portion 102 includes a shift request determining portion 110. The electronic control device 70 corresponds to a control device of a vehicle of the present invention.

The engine control portion 100 applies the accelerator opening degree θacc and the vehicle speed V (synonymous with the AT output rotation speed No, etc.) to a relationship (e.g., a driving force map) obtained empirically or through design and stored in advance (i.e., predefined) to calculate a required drive force Fdem. The engine control portion 100 sets a target engine torque Tetgt at which the required drive force Fdem is acquired, in consideration of a transmission loss, an accessory load, the gear ratio γ of the automatic transmission 22, etc., and outputs the engine control command signal Se for providing the output control of the engine 12 to a throttle actuator, a fuel injection device, an ignition device, etc. such that the target engine torque Tetgt is acquired.

The shift request determining portion 110 of the shift control portion 102 uses a predefined relationship (shift map, shift diagram) to make a shift determination on whether to provide a control of switching the gear position of the automatic transmission 22, and thereby determines a shift request. The shift request determining portion 110 applies the operational state (a vehicle speed related value and a drive request amount) to the shift map to determine the shift request from the driver (i.e., determine the gear position to be formed in the automatic transmission 22).

The shift map is a predetermined relationship having shift lines for determining a shift request from the driver on two-dimensional coordinates having the vehicle speed related value and the drive request amount as variables. The shift lines in the shift map are up lines for determining an upshift request and down lines for determining a downshift request. The up lines and the down lines are each determined in advance between gear positions having a difference of one speed from each other in a plurality of gear positions. The shift lines are each used for determining whether the line is crossed by the actual vehicle speed related value on a line indicative of a certain drive request amount or whether the line is crossed by the actual drive request amount on a line indicative of a certain vehicle speed related value, i.e., whether the vehicle speed related value or the drive request amount has crossed a value (shift point) on the shift line at which a shift should be executed, and are each defined in advance as a series of the shift points. The vehicle speed related value is the vehicle speed V or a value related to the vehicle speed V and is, for example, the vehicle speed V, a wheel speed, or the AT output rotation speed No. The drive request amount is a value representative of a magnitude of a drive request from a driver to the vehicle 10 and is, for example, the above-described required drive force Fdem [B] or a required drive torque [Nm] and a required drive power [W] related to the required drive force Fdem [N]. The accelerator opening degree θacc [%], the throttle valve opening degree θth [%], the intake air amount [g/sec], etc. can simply be used as the drive request amount.

When a shift request of the automatic transmission 22 is determined in the shift request determining portion 110, the shift control portion 102 outputs to the valve drive control circuit 68 the shift output signal Sat giving an instruction for the shift of the automatic transmission 22 after elapse of a first predetermined time T1 from the time of determination of the shift request. The first predetermined time T1 is a preset delay time for determining whether the shift of the automatic transmission 22 may actually be performed based on the shift request determined by the shift request determining portion 110, for example. The shift output signal Sat output to the valve drive control circuit 68 is a hydraulic control command signal output to the hydraulic control circuit 50 so as to cause the automatic transmission 22 to form the gear position after the shift. The shift output signal Sat represents an engagement-element instruction pressure output to the solenoid valve SL supplying a hydraulic pressure to the hydraulic actuator ACT of the engagement-side hydraulic friction engagement device that is involved in the requested shift and that establishes the gear position after the shift, for acquiring a clutch torque of an engagement element at the time of the shift (also referred to as an engagement-side clutch torque), and a release-element instruction pressure output to the solenoid valve SL corresponding to the release-side hydraulic friction engagement device involved in the requested shift for acquiring a clutch torque of a release element at the time of the shift (also referred to as a release-side clutch torque).

At the time of the shift of the automatic transmission 22, the shift control portion 102 performs a so-called clutch-to-clutch shift (C-to-C shift) making a change in engagement between a pair of the hydraulic friction engagement devices C involved in the shift of the automatic transmission 22 by outputting the shift output signal Sat to the valve drive control circuit 68. For example, in an upshift from the second speed gear position "2nd" to the third speed gear position "3rd", the clutch-to-clutch shift is performed by releasing the first brake B1 that is the hydraulic friction engagement device on the release side and engaging the third clutch C3 that is the hydraulic friction engagement device on the engagement side.

The shift output signal Sat includes a quick-apply signal Squi to the solenoid valve SL corresponding to the engagement-side hydraulic friction engagement device to be engaged at the time of the shift based on the shift request determined by the shift request determining portion 110, so that a quick-apply control is provided in the hydraulic actuator ACT of the engagement-side hydraulic friction engagement device. The quick-apply signal Squi is a signal for rapidly driving a spool valve of the solenoid valve SL corresponding to the engagement-side hydraulic friction engagement device in the valve opening direction and is included in the engagement-element instruction pressure of the shift output signal Sat.

The pulsation drive control portion 104 provides a pulsation drive control (a dither control) by selectively pulsating a plurality of the solenoid valves SL in a certain cycle for discharging foreign matter between, for example, a valve body and a land portion of the spool valve in the selected solenoid valve SL. If the provision of the pulsation drive control is not prohibited as described later, the pulsation drive control portion 104 outputs a pulsation drive signal Sd (operation signal for the dither control) via the valve drive control circuit 68 to the solenoid valves SL supplying the hydraulic pressures to the hydraulic actuators ACT of the hydraulic friction engagement devices C other than the hydraulic friction engagement devices C put into the engaged state for establishing the current gear position of the automatic transmission 22. To pulsate the spool valve of the solenoid valve SL in the axial direction with a relatively large amplitude at a relatively high frequency, this pulsation drive signal Sd has an instruction current value that is a square wave having, for example, a predetermined amplitude according to a maximum current value slightly lower than an instruction current value based on a quick-apply signal output at the time of the quick-apply control and a minimum current value, a predetermined frequency, and, for example, a duty ratio of 50%. The relatively large amplitude of the spool valve described above is, for example, an amplitude with which the solenoid valve SL is alternately switched between a state in which the input port and the output port are allowed to communicate with each other and a state in which the output port and the discharge port are allowed to communicate each other. The maximum current value of the pulsation drive signal Sd is a current value achieving an amplitude at the time of pulsation of the spool valve such that the input port and the output port of the solenoid valve SL are at least put into a communicating state. The pulsation drive control for the solenoid valve SL by the pulsation drive control portion 104 causes the spool valve to pulsate in the axial direction in the solenoid valve SL, and the foreign matter in the solenoid valve SL is discharged.

The pulsation drive control may be being provided in the solenoid valve SL supplying the hydraulic pressure to the engagement-side hydraulic friction engagement device to be engaged at the time of the shift of the automatic transmission 22 based on the shift request determined by the shift request determining portion 110. In this case, to deal with the shift request, the pulsation drive control is terminated in the solenoid valve SL of the engagement-side hydraulic friction engagement device and the quick-apply control is started by outputting the quick-apply signal Squi for promptly supplying the hydraulic fluid to the solenoid valve SL. For example, immediately after the termination of the pulsation drive control, the hydraulic pressure supplied from the solenoid valve SL to the hydraulic actuator ACT of the engagement-side hydraulic friction engagement device is not stable because of the pulsation of the spool valve of the solenoid valve SL due to the pulsation drive control. Therefore, if the quick-apply control is started immediately after the termination of the pulsation drive control, a hydraulic pressure larger than a normal hydraulic pressure at the time of packing acts on the hydraulic actuator ACT of the engagement-side hydraulic friction engagement device, causing a problem that a stroke hit may occur in the engagement-side hydraulic friction engagement device. The normal hydraulic pressure at the time of packing is a hydraulic pressure, for example, when the pulsation drive control is not provided in the solenoid valve SL supplying a hydraulic pressure to the hydraulic actuator ACT of the engagement-side hydraulic friction engagement device involved in the shift and the quick-apply control is started in a state in which the hydraulic pressure supplied from the solenoid valve SL is stable. If the start of the quick-apply control for the engagement-side hydraulic friction engagement device is delayed, to solve the problem, from the time point of termination of the pulsation drive control until stabilization of the hydraulic pressure supplied to the hydraulic actuator of the engagement-side hydraulic friction engagement device from the solenoid valve SL, a problem of reduced drivability occurs.

When the shift request is determined by the shift request determining portion 110, the pulsation drive control prohibiting portion 106 terminates the pulsation drive control being provided when the shift request is made regardless of whether the solenoid valve SL undergoing the pulsation drive control provided by the pulsation drive control portion 104 at the time of determination of the shift request is the solenoid valve SL supplying the hydraulic pressure to the hydraulic actuator ACT of the engagement-side hydraulic friction engagement device achieving the requested shift. At the same time as the termination of the pulsation drive control, when the shift request is determined by the shift request determining portion 110, the pulsation drive control prohibiting portion 106 outputs to the pulsation drive control portion 104 a pulsation drive control prohibiting signal prohibiting the provision of the pulsation drive control to prohibit the provision of the pulsation drive control in all the solenoid valves SL for a predetermined time from the time of determination of the shift request regardless of whether the solenoid valves SL are those supplying the hydraulic pressure to the hydraulic actuator ACT of the engagement-side hydraulic friction engagement device achieving the requested shift.

When acquiring the command signal terminating the pulsation drive control from the pulsation drive control prohibiting portion 106, the pulsation drive control portion 104 terminates the output of the pulsation drive signal Sd to the solenoid valve SL via the valve drive control circuit 68 at the time of determination of the shift request so as to terminate the pulsation drive control for the solenoid valve SL. Additionally, while the pulsation drive control prohibiting signal is output, the pulsation drive control portion 104 does not provide the pulsation drive control to the solenoid valves SL.

The quick-apply control prohibiting portion 108 acquires a signal indicative of the solenoid valve SL undergoing the pulsation drive control provided by the pulsation drive control portion 104 as needed. When the shift request is determined by the shift request determining portion 110, the quick-apply control prohibiting portion 108 determines whether the solenoid valve SL supplying the hydraulic pressure to the hydraulic actuator ACT of the engagement-side hydraulic friction engagement device to be subjected to the quick-apply control for achieving the requested shift is the solenoid valve SL having undergone the pulsation drive control immediately before the time of determination of the shift request.

Figure 5:
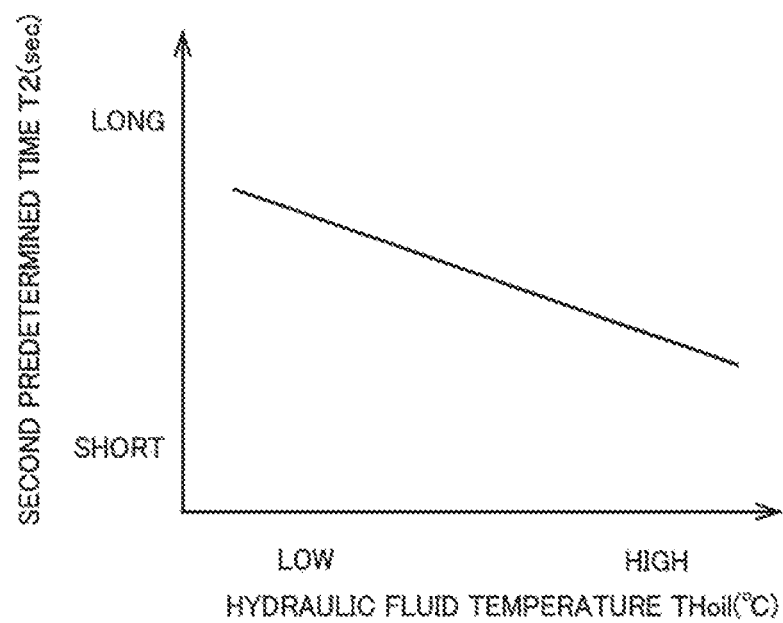
FIG. 5 is a diagram of an example of a predefined relationship between a temperature of hydraulic fluid of a hydraulic control circuit of FIG. 1 and a second predetermined time.

When the above determination is affirmative, the quick-apply control prohibiting portion 108 counts an elapsed time T from the time of determination of the shift request, i.e., from the time of termination of the pulsation drive control for the solenoid valve SL, and determines whether the elapsed time T exceeds a second predetermined time T2. The second predetermined time T2 is the elapsed time from the time of termination of the pulsation drive control required for sufficiently stabilize the hydraulic pressure supplied to the engagement-side hydraulic friction engagement device after termination of the pulsation drive control. As a result, when the quick-apply control for the engagement-side hydraulic friction engagement device is started after the elapse of the second predetermined time T2 from the termination of the pulsation drive control by the solenoid valve St having undergone the pulsation drive control immediately before the time of determination of the shift request, the stroke hit can be restrained from occurring in the engagement-side hydraulic friction engagement device. The second predetermined time T2 is set, for example, from a predefined relationship in which the second predetermined time T2 becomes shorter as the hydraulic fluid temperature THoil, i.e., the temperature of the hydraulic fluid in the hydraulic control circuit 50, becomes higher, based on the actual temperature THoil of the hydraulic fluid in the hydraulic control circuit 50 detected by the oil temperature sensor 66. FIG. 5 shows an example of the relationship. As a result, although becoming shorter as the hydraulic fluid temperature THoil becomes higher, the second predetermined time T2 set from the predefined relationship is longer than the first predetermined time T1 from the time of determination of the shift request to the output of the shift output signal Sat regardless of the hydraulic fluid temperature THoil.

If it is determined that the elapsed time T from the time point of termination of the pulsation drive control for the solenoid valve SL has not exceeded the second predetermined time T2, the quick-apply control prohibiting portion 108 prohibits the output of the quick-apply signal Squi by the shift control portion 102 to the solenoid valve SL supplying the hydraulic pressure to the hydraulic actuator ACT of the engagement-side hydraulic friction engagement device at the time of the shift based on the shift request and thereby prohibits the quick-apply control using the quick-apply signal Squi. If it is determined that the elapsed time T from the time point of termination of the pulsation drive control for the solenoid valve SL has exceeded the second predetermined time T2, the quick-apply control prohibiting portion 108 permits the output of the quick-apply signal Squi by the shift control portion 102 to the solenoid valve SL of the engagement-side hydraulic friction engagement device and thereby permits the quick-apply control using the solenoid valve SL. As a result, if the solenoid valve SL supplying the hydraulic pressure to the hydraulic actuator ACT of the engagement-side hydraulic friction engagement device to be subjected to the quick-apply control is the solenoid valve SL having undergone the pulsation drive control immediately before the time of determination of the shift request, the quick-apply control for the engagement-side hydraulic friction engagement device using the solenoid valve SL having undergone the pulsation drive control is started after the elapse of the second predetermined time T2 from the time of termination of the pulsation drive control. If it is determined that the solenoid valve SL supplying the hydraulic pressure to the hydraulic actuator ACT of the engagement-side hydraulic friction engagement device to be subjected to the quick-apply control is not the solenoid valve SL having undergone the pulsation drive control immediately before the time of determination of the shift request, the quick-apply control prohibiting portion 108 does not prohibit the output of the quick-apply signal Squi to the solenoid valve SL.

Figure 7:
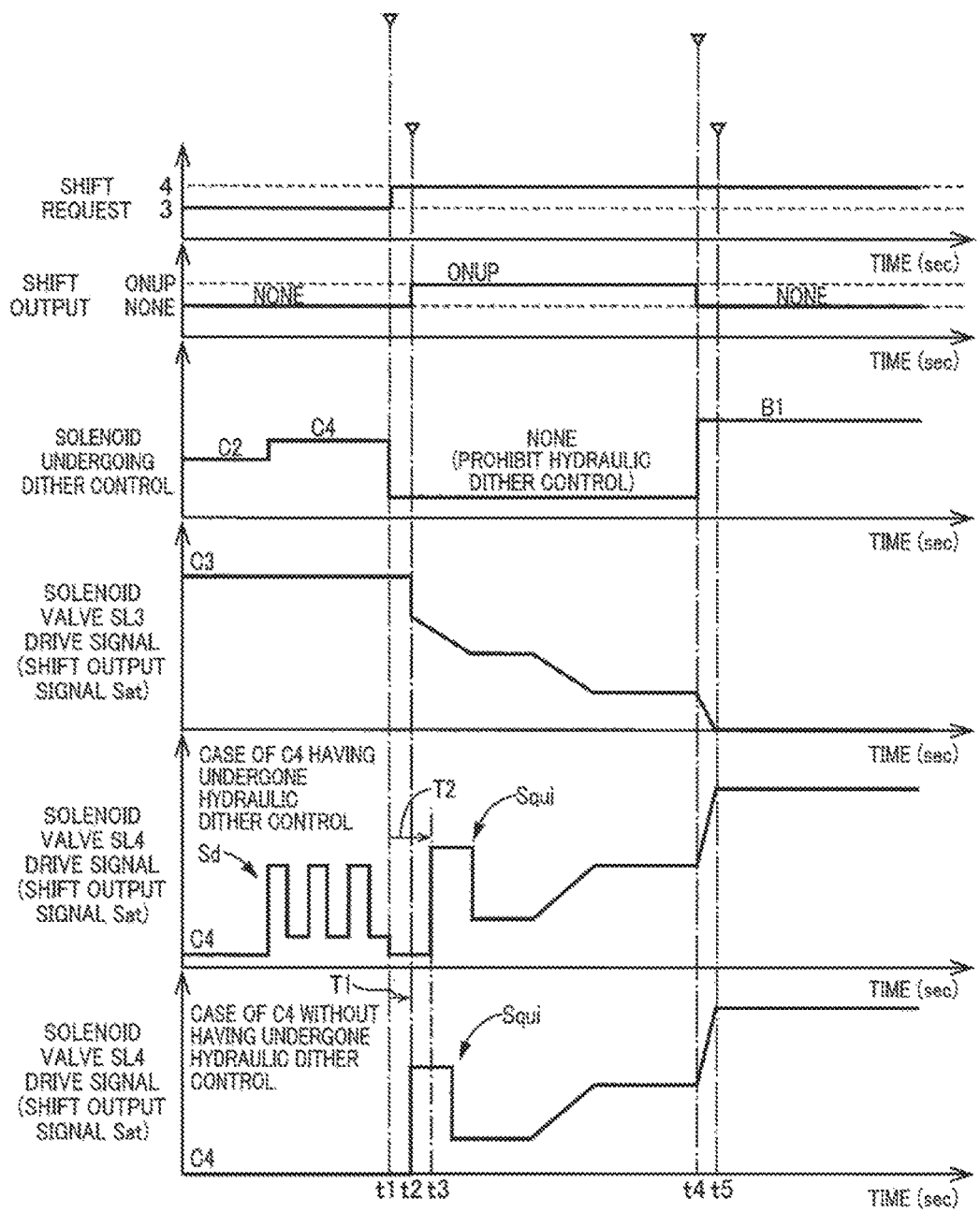
FIG. 7 is a time chart of a control operation of the electronic control device shown in FIG. 1 for explaining the starting timing of the quick-apply control at the time of an upshift of the automatic transmission from the third speed gear position to the fourth speed gear position when the pulsation drive control is provided immediately before the time of determination of a shift request, and when the pulsation drive control is not provided, in a solenoid valve SL4 of a fourth clutch C4 to be subjected to the quick-apply control.

While the output of the quick-apply signal Squi is prohibited by the quick-apply control prohibiting portion 108 after the elapse of the first predetermined time T1 from the time of determination of the shift request, the shift control portion 102 does not supply the quick-apply signal Squi to the solenoid valve SL supplying the hydraulic pressure to the hydraulic actuator ACT of the engagement-side hydraulic friction engagement device at the time of the shift based on the shift request and does not start the quick-apply control for the engagement-side hydraulic friction engagement device. When the output of the quick-apply signal Squi is permitted by the quick-apply control prohibiting portion 108 after the elapse of the first predetermined time T1 from the time of determination of the shift request, the shift control portion 102 supplies the quick-apply signal Squi to the solenoid valve SL supplying the hydraulic pressure to the hydraulic actuator ACT of the engagement-side hydraulic friction engagement device at the time of the shift based on the shift request so as to start the quick-apply control for the engagement-side hydraulic friction engagement device. If the output of the quick-apply signal Squi is not prohibited from the time of determination of the shift request, i.e., from the time point of termination of the pulsation drive control for the solenoid valve SL, the shift control portion 102 outputs the quick-apply signal Squi to the hydraulic control circuit 50 when the first predetermined time T1 has elapsed from the time of determination of the shift request, i.e., at the same time as the start of output of the release-element instruction pressure, so as to start the quick-apply control for the engagement-side hydraulic friction engagement device. As a result, when the solenoid valve SL supplying the hydraulic pressure to the hydraulic actuator ACT of the engagement-side hydraulic friction engagement device to be subjected to the quick-apply control is the solenoid valve SL having undergone the pulsation drive control immediately before the time of determination of the shift request, a delay time in the start of the quick-apply control for the engagement-side hydraulic friction engagement device is reduced to a predetermined time (T2−T1) from the output start point of the release-element instruction pressure included in the shift output signal Sat. For example, as shown in FIG. 7 described later, as compared to when the quick-apply control is started after the second predetermined time T2 from the time of output of the shift output signal Sat (time T2), the start delay is suppressed in the quick-apply control for the engagement-side hydraulic friction engagement device from the start of output of the shift output signal Sat and, therefore, a reduction in drivability due to a delay in operation of the solenoid valve SL is suppressed. Additionally, if the solenoid valve SL supplying the hydraulic pressure to the hydraulic actuator ACT of the engagement-side hydraulic friction engagement device to be subjected to the quick-apply control is not the solenoid valve SL having undergone the pulsation drive control immediately before the time of determination of the shift request, the quick-apply control for the engagement-side hydraulic friction engagement device is started at the same time as the start of output of the shift output signal Sat (release-element instruction pressure) when the first predetermined time T1 has elapsed from the time of determination of the shift request and, therefore, the start of the quick-apply control is not delayed from the output start point of the shift output signal Sat.

Figure 6:
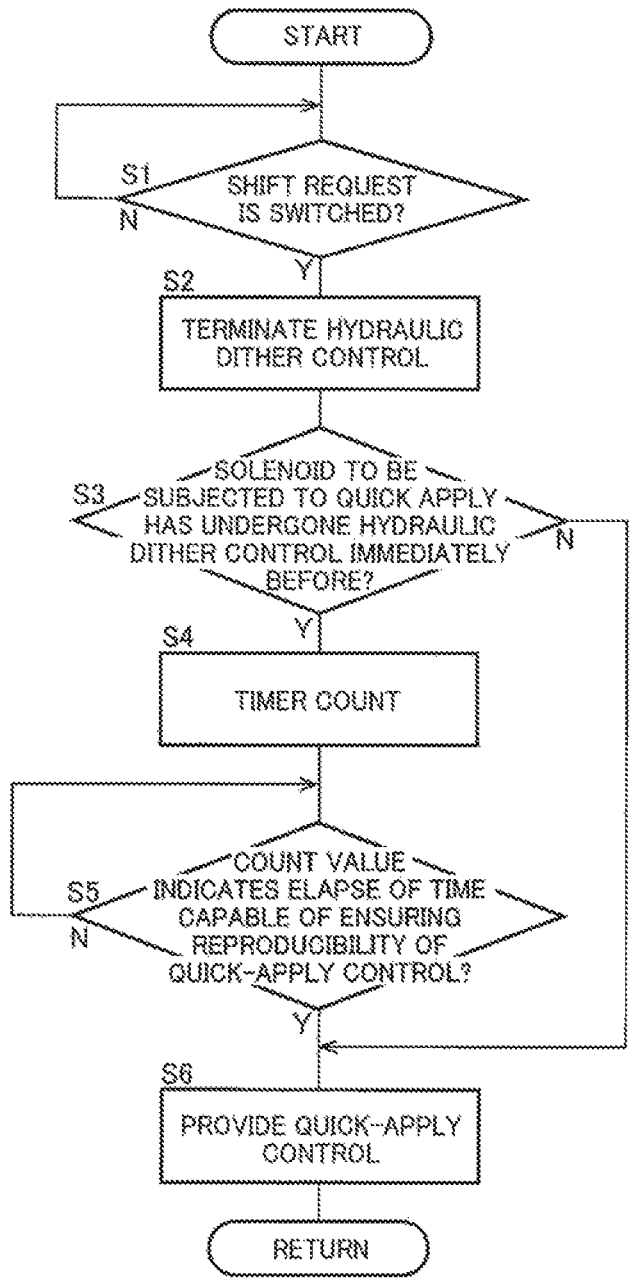
FIG. 6 is a flowchart for explaining a main portion of a control operation of an electronic control device shown in FIG. 1.

FIG. 6 is a flowchart for explaining a main portion of the control operation of the electronic control device 70. FIG. 7 is a time chart of a control operation of the electronic control device 70 for explaining the starting timing of the quick-apply control at the time of an upshift of the automatic transmission 22 from the third speed gear position to the fourth speed gear position when the pulsation drive control is provided immediately before the time of determination of a shift request, and when the pulsation drive control is not provided, in the solenoid valve SL4 of the fourth clutch C4 to be subjected to the quick-apply control. In FIG. 7, C2, C3, C4, and B1 in time charts showing the solenoid valve SL undergoing the pulsation drive control (solenoid undergoing dither control) and a solenoid valve SL drive signals denote the hydraulic friction engagement devices C to which the hydraulic pressures are supplied from the solenoid valves SL thereof.

In FIG. 6, at S1 corresponding to the function of the shift request determining portion 110, it is determined whether the gear position formed in the automatic transmission 22 determined based on the vehicle speed related value and the drive request amount from the predefined shift map is switched from the current gear position, i.e., whether a shift request is determined. If the determination of S1 is negative, S1 is executed again. If it is determined that the gear position formed in the automatic transmission 22 is switched from the third speed gear position to the fourth speed gear position (time t1 of FIG. 7) and the determination of S1 is affirmative, the pulsation drive control for the solenoid valve SL4 of the fourth clutch C4 provided immediately before the time of determination of the shift request (time t1 of FIG. 7) is terminated at S2 corresponding to the function of the pulsation drive control portion 104 (time t1 of FIG. 7). Additionally, a pulsation drive control prohibition (hydraulic dither control prohibition) signal is outputted from the pulsation drive control prohibiting portion 106 to the pulsation drive control portion 104, so that the pulsation drive control for the solenoid valve SL is prohibited during a period from the time of determination of the shift request (time t1) to time t4 at which the output of the shift output signal Sat to the valve drive control circuit 68 is stopped. At S3 corresponding to the function of the quick-apply control prohibiting portion 108 of FIG. 6, it is determined whether the engagement-side hydraulic friction engagement device to be subjected to the quick-apply control for achieving the requested shift determined by the shift request determining portion 110 is the engagement-side hydraulic friction engagement device having undergone the pulsation drive control immediately before the time of determination of the shift request (time t1) (time t1 of FIG. 7). If the determination of S3 is affirmative, the elapsed time T is counted from the time point of determination of the shift request, i.e., the time point of termination of the pulsation drive control (time t1 of FIG. 7) at S4 corresponding to the function of the quick-apply control prohibiting portion 108. At S5 corresponding to the function of the quick-apply control prohibiting portion 108, it is determined whether the elapsed time T (count value) from the time point of end of the pulsation drive control has exceeded the second predetermined time T2. In other words, a determination is made on whether the second predetermined time T2 has elapsed that is required for the hydraulic pressure supplied to the hydraulic actuator ACT of the engagement-side hydraulic friction engagement device to enter a stable state from the time point of termination of the pulsation drive control for the solenoid valve SL (time t1) so that the quick-apply control for the engagement-side hydraulic friction engagement device can be provided while suppressing the occurrence of the stroke hit in the engagement-side hydraulic friction engagement device when the solenoid valve SL supplying the hydraulic pressure to the hydraulic actuator ACT of the engagement-side hydraulic friction engagement device to be subjected to the quick-apply control is the solenoid valve SL having undergone the pulsation drive control immediately before the time of determination of the shift request. If the determination of S5 is negative, S5 is executed again. If the determination of S5 is affirmative and if the determination of S3 is negative, the quick-apply control for the engagement-side hydraulic friction engagement device is started (provided) at S6 corresponding to the function of the shift control portion 102. After execution of S6, this flow chart is terminated.

In FIG. 7, if the pulsation drive control is provided immediately before the time of determination of the shift request (time t1 of FIG. 7) in the solenoid valve SL4 supplying the hydraulic pressure to the hydraulic actuator ACT4 of the fourth clutch C4 to be subjected to the quick-apply control, the quick-apply control for the fourth clutch C4 is started at time t3 after the elapse of the second predetermined time T2 from the time point of termination of the pulsation drive control (the time point of determination of the shift request (time t1)). On the other hand, if the pulsation drive control is not provided immediately before the time point of determination of the shift request (time t1 of FIG. 7) in the solenoid valve SL4 supplying the hydraulic pressure so the hydraulic actuator ACT4 of the fourth clutch C4 to be subjected to the quick-apply control, the quick-apply control is started at the output start point of the shift output signal Sat (release-element instruction pressure) (time t2 of FIG. 7) after the elapse of the first predetermined time T1 from the time point of determination of the shift request (time t1 of FIG. 7). Therefore, if the pulsation drive control is provided immediately before the time point of determination of the shift request (time t1 of FIG. 7) in the solenoid valve SL4 supplying the hydraulic pressure to the hydraulic actuator ACT4 of the fourth clutch C4 to be subjected to the quick-apply control, the delay time in the start of the quick-apply control for the fourth clutch C4 is reduced to a delay of a predetermined time (T2−T1) from the output start point of the shift output signal Sat (time t2 of FIG. 7). At time t4 of FIG. 7 when the output of the shift output signal Sat from the shift control portion 102 to the valve drive control circuit 68 is terminated, the synchronization of the fourth clutch C4 is determined and the pressure is increased to the line pressure PL, and at time t5 of FIG. 7, the third clutch C3 is put into the completely released state and the fourth clutch C4 is put into the completely engaged state.

Figure 8:
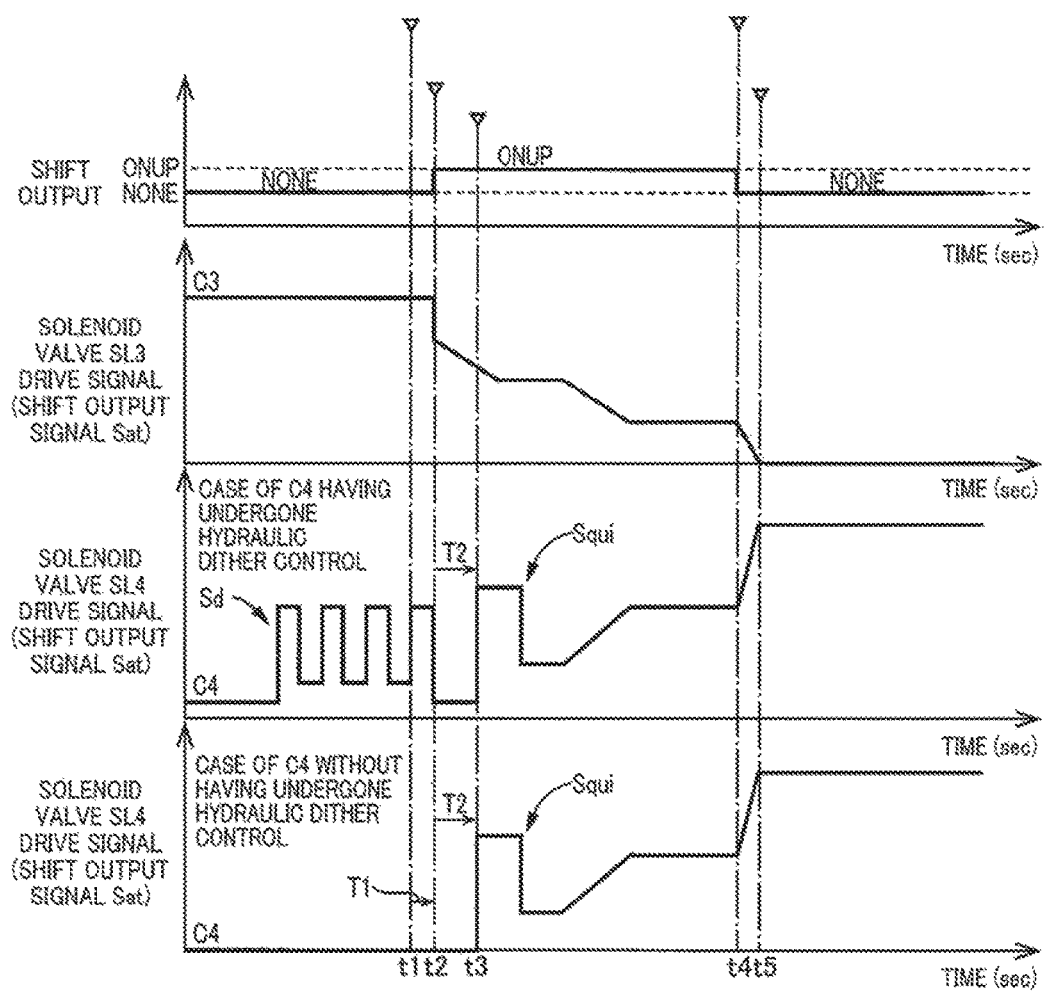
FIG. 8 is a time chart of an example of a control operation of an electronic control device that is a comparative example for explaining the starting time point of the quick-apply control at the time of an upshift of the automatic transmission from the third speed gear position to the fourth speed gear position when the pulsation drive control is provided immediately before the time of determination of a shift request, and when the pulsation drive control is not provided, in the solenoid valve SL4 of the fourth clutch C4 to be subjected to the quick-apply control.

FIG. 8 is a time chart of an example of a control operation of an electronic control device that is a comparative example for explaining the starting time point of the quick-apply control at the time of an upshift of the automatic transmission 22 from the third speed gear position to the fourth speed gear position when the pulsation drive control is provided immediately before the time of determination of a shift request, and when the pulsation drive control is not provided, in the solenoid valve SL4 of the fourth clutch C4 to be subjected to the quick-apply control. In FIG. 8, C3 and C4 in time charts showing the solenoid valve SL drive signals denote the hydraulic friction engagement devices C to which the hydraulic pressures are supplied from the solenoid valves SL thereof. If the pulsation drive control is provided in the solenoid valve SL4 of the fourth clutch C4 that is the engagement-side hydraulic friction engagement device achieving the requested shift immediately before the time of determination of the shift request (time t1 of FIG. 8) when the shift request from the third speed gear position to the fourth speed gear position of the automatic transmission 22 is determined, the pulsation drive control in the solenoid valve SL4 of the fourth clutch C4 is terminated at the output start point of the shift output signal Sat (time t2 of FIG. 8) after the elapse of the first predetermined time T1 from the time of determination of the shift request. In this case, the provision of the quick-apply control for the fourth clutch C4 is started at time t3 of FIG. 8 after the elapse of the second predetermined time T2 from the time point of termination of the pulsation drive control, i.e., the output start point of the shift output signal Sat (time t2). On the other hand, even if the pulsation drive control is not provided in the solenoid valve SL4 of the fourth clutch C4 immediately before the time of determination of the shift request (time t1), the provision of the quick-apply control for the fourth clutch C4 is started at time t3 of FIG. 8 after the elapse of the second predetermined time T2 from the output start point of the shift output signal Sat. Therefore, if the pulsation drive control is provided immediately before the time of determination of the shift request in the solenoid valve SL4 corresponding to the fourth clutch C4 to be subjected to the quick-apply control, the quick-apply control for the fourth clutch C4 is started at time t3 after the elapse of the second predetermined time T2 for stabilizing the hydraulic pressure supplied to the hydraulic actuator ACT4 of the fourth clutch C4 from the time of termination of the pulsation drive control and, therefore, the stroke hit due to the quick-apply control for the fourth clutch C4 is suppressed. However, since the pulsation drive control for the solenoid valve SL4 is terminated at the output start point of the shift output signal Sat (time t2), the start of the quick-apply control is delayed from the output start point of the shift output signal Sat (time t2 of FIG. 8) by the second predetermined time T2, so that the drivability may be reduced. Even if the pulsation drive control is not provided immediately before the time of determination of the shift request (time t1) in the solenoid valve SL4 corresponding to the fourth clutch C4 to be subjected to the quick-apply control, the quick-apply control for the fourth clutch C4 is started (at time t3 of FIG. 8) with a delay of the second predetermined time T2 from the output start point of the shift output signal Sat (time t2 of FIG. 8). As described above, in the case of the electronic control device of the comparative example, the quick-apply control in the engagement-side hydraulic friction engagement device involved in the requested shift is started with a delay of the second predetermined time T2 from the shift output signal Sat (release-element instruction pressure) regardless of whether the pulsation drive control is provided immediately before the output start point of the shift output signal Sat (time t1), and therefore, the drivability may be reduced.

As described above, the electronic control device 70 of this example includes the pulsation drive control portion 104 providing the pulsation drive control of selectively pulsating a plurality of the solenoid valves SL in a predetermined cycle, and the quick-apply control prohibiting portion 108 prohibiting a provision of the quick-apply control using the quick-apply signal Squi for the second predetermined time T2 from the time of termination of the pulsation drive control, and permitting the provision of the quick-apply control after the elapse of the second predetermined time T2, for the solenoid valve SL having undergone the pulsation drive control out of the plurality of the solenoid valves SL, and the pulsation drive control portion 104 terminates the pulsation drive control for the solenoid valve SL undergoing the pulsation drive control out of the plurality of the solenoid valves SL when the shift request is made. Therefore, since the pulsation drive control is terminated when the shift request is determined, the quick-apply control can be started earlier by the first predetermined time T1 as compared to the case of FIG. 8 when the quick-apply control is started after the elapse of the second predetermined time T2 from the termination of the pulsation drive control at the time point of output of the shift output signal Sat (release-element instruction pressure) after the elapse of the first predetermined time T1 from the time of determination of the shift request. As a result, even if the solenoid valve SL of the engagement-side hydraulic friction engagement device achieving the requested shift is the solenoid valve SL having undergone the pulsation drive control immediately before the time of determination of the shift request in the vehicle 10 providing the pulsation drive control for the solenoid valves SL, the start delay of the quick-apply control can be suppressed. Consequently, the reduction in drivability due to the operation delay of the solenoid valve SL can be suppressed.

According to the electronic control device 70 of this example, the second predetermined time T2 is set shorter as the temperature THoil of the hydraulic fluid in the hydraulic control circuit 50 becomes higher. Therefore, the second predetermined time T2 from the termination of the pulsation drive control to the stabilization of the pressure of the hydraulic fluid supplied to the engagements-side hydraulic friction engagement device to be subjected to the quick-apply control is set depending on the hydraulic fluid temperature THoil, so that the start delay of the quick-apply control in the hydraulic friction engagement device can further be suppressed as compared to when the second predetermined time T2 is set in advance as a constant value, for example.

According to the electronic control device 70 of this example, the shift of the automatic transmission 22 is performed by releasing the release-side hydraulic friction engagement device and engaging the engagement-side hydraulic friction engagement device out of the plurality of hydraulic friction engagement devices, and the solenoid valve SL having undergone the pulsation drive control controls a pressure of the hydraulic fluid to the engagement-side hydraulic friction engagement device. Therefore, the pulsation drive control is terminated in the engagement-side hydraulic friction engagement device achieving the clutch-to-clutch shift at the time point of determination of the shift request, so that as compared to when the quick-apply control for the engagement-side hydraulic friction engagement device is started after the second predetermined time T2 from the termination of the pulsation drive control for the engagement-side hydraulic friction engagement device at the time point of output of the shift output signal Sat, the start delay of the quick-apply control can be suppressed in the engagement-side hydraulic friction engagement device achieving the clutch-to-clutch shift. As a result, the reduction in drivability due to the operation delay of the solenoid valve SL can be suppressed in the clutch-to-clutch shift.

Although the present invention has been described in detail with reference to the table and the drawings, the present invention can further be implemented in other forms and may variously be modified without departing from the spirit thereof.

For example, according to the electronic control device 70 of the example described above, when a shift request is determined, the pulsation drive control for the solenoid valve is terminated when the shift request is made regardless of whether the solenoid valve SL undergoing the pulsation drive control provided by the pulsation drive control portion 104 at the time of determination of the shift request is the solenoid valve SL supplying the hydraulic pressure to the hydraulic actuator ACT of the engagement-side hydraulic friction engagement device achieving the requested shift; however, the present invention is not limited thereto and, for example, the pulsation drive control may be terminated at least for the solenoid valve SL achieving the requested shift, and the pulsation drive control may not necessarily be terminated for the solenoid valve SL not involved in the requested shift.

Additionally, in the hydraulic control circuit 50 of the example described above, the solenoid valve SL is configured to directly supply the hydraulic pressure to the hydraulic actuator ACT of the hydraulic friction engagement device C; however, the present invention is not limited thereto and, for example, the solenoid valve SL may be configured to supply the hydraulic pressure through a control valve to the hydraulic actuator ACT of the hydraulic friction engagement device C. Even with such a hydraulic control circuit, foreign matter can be discharged from the control valve by an intermittent drive (ON/OFF drive) of the solenoid valve SL, for example. The intermittent drive described above is an opening/closing drive of the solenoid valve SL in a predetermined cycle, that is, a switching between a state of supplying a hydraulic pressure from the control valve to the hydraulic actuator ACT and a state of discharging a hydraulic pressure from the hydraulic actuator through the control valve.

Additionally, although the pulsation drive control portion 104 of the example described above outputs the pulsation drive signal Sd that is a square wave, the signal may be a triangular wave or a sawtooth wave.

The above description is merely an embodiment and the present invention can be implemented in variously modified and improved forms based on the knowledge of those skilled in the art without departing from the spirit thereof although not exemplarily illustrated one by one.

REFERENCE SIGNS LIST

10: Vehicle
22: Automatic transmission (Multi-speed transmission)
70: Electronic control device (Control device of a vehicle)
104: Pulsation drive control portion
108: Quick-apply control prohibiting portion
SL: Solenoid valve (Pressure control solenoid valve)
Squi: Quick-apply signal
Sat: Shift output signal
T1; First predetermined time
T2; Second predetermined time

What is claimed is:

1. A control device of a vehicle including a multi-speed transmission switching gear shift positions in accordance with combination of operations of a plurality of hydraulic friction engagement devices and a plurality of pressure control solenoid valves respectively controlling pressures of hydraulic fluid to the plurality of hydraulic friction engagement devices, the control device of a vehicle shifting gears by providing a shift output signal including a quick-apply signal to the plurality of pressure control solenoid valves after a first predetermined time from a shift request based on an operational state, the control device comprising:

a pulsation drive control portion configured to provide a pulsation drive control of selectively pulsating the plurality of pressure control solenoid valves in a predetermined cycle; and a quick-apply control prohibiting portion configured to prohibit a provision of a quick-apply control using the quick-apply signal for a second predetermined time longer than the first predetermined time from a time of termination of the pulsation drive control, and to permit the provision of the quick-apply control after the elapse of the second predetermined time, for a pressure control solenoid valve having undergone the pulsation drive control out of the plurality of pressure control solenoid valves, the pulsation drive control portion being further configured to terminate the pulsation drive control for a pressure control solenoid valve undergoing the pulsation drive control out of the plurality of pressure control solenoid valves when the shift request is made.

2. The control device of a vehicle according to claim 1, wherein the second predetermined time is set shorter as a temperature of the hydraulic fluid becomes higher.

3. The control device of a vehicle according to claim 1, wherein the shift of the multi-speed transmission is performed by releasing a release-side hydraulic friction engagement device and engaging an engagement-side hydraulic friction engagement device out of the plurality of hydraulic friction engagement devices, and wherein the pressure control solenoid valve having undergone the pulsation drive control controls a pressure of the hydraulic fluid to the engagement-side hydraulic friction engagement device.

* * * * *